United States Patent Office 3,354,116
Patented Nov. 21, 1967

3,354,116
COMPOUNDING PROCEDURE FOR ACIDIC-TERMINATED POLYMERS
Jerry T. Gruver and Gerard Kraus, Bartlesville, Okla., assignors to Phillips Petroleum Company, a corporation of Delaware
No Drawing. Filed Nov. 12, 1964, Ser. No. 410,737
8 Claims. (Cl. 260—41.5)

ABSTRACT OF THE DISCLOSURE

The tensile strength of an acidic-terminated polymer vulvanizate is increased by treating the polymer prior to compounding and curing with from 0.5 to 10 parts by weight of an N-nitroso(nitroso-substituted aryl) amine, at a temperature of 100–300° F.

This invention relates to new and useful polymer compositions and to a method for their preparation. In one aspect this invention relates to an improved method for compounding acidic-terminated unsaturated polymers prior to subjecting them to a curing procedure. In another aspect it relates to a process for treating low molecular weight unsaturated acidic-terminated polymers with an N-nitroso(nitroso-substituted aryl)amine prior to addition of carbon black and curatives. In still another aspect this invention relates to the resulting cured products of this compounding and curing treatment.

As used herein, the term "acidic-terminated polymer" designates those polymers which contain a reactive acidic group on at least one end of the polymer chain.

Polymers, containing both unsaturation and reactive terminal groups, are readily prepared by polymerizing a conjugated diene either alone or in conjunction with various compounds copolymerizable therewith in the presence of an organo alkali metal catalyst compound, and treating the unquenched reaction mixture with different types of acidic reagents. The polymer can be a homopolymer of a conjugated diene, a copolymer of two or more conjugated dienes, or a copolymer of a conjugated diene with a minor amount of a monomer copolymerizable therewith such as the vinyl-substituted aromatic compounds and certain polar monomers. The preferred monomers are the conjugated dienes containing from 4–12 carbon atoms per molecule and preferably 4–8 carbon atoms per molecule, such as 1,3-butadiene; isoprene; 1,3-pentadiene (piperylene); 2-methyl-1,3-pentadiene; 2-methyl-1,3-hexadiene; 2-phenyl-1,3-butadiene; 3,4-dimethyl-1,3-hexadiene; 4,5-diethyl-1,3-octadiene; etc. In addition, conjugated dienes containing reactive substituents along the chain can also be employed such as, for example, halogenated dienes such as chloroprene, fluoroprene, etc. Of the conjugated dienes, the preferred material is 1,3-butadiene; however, isoprene and piperylene are also especially suitable.

The vinyl-substituted aromatic compounds include styrene, 1-vinylnaphthalene, 2-vinylnaphthalene, and alkyl, cycloalkyl, aryl alkaryl, aralkyl, alkoxy, aryloxy, and dialkylamino derivatives thereof in which the total number of carbon atoms in the combined substituents other than the vinyl group is generally not greater than 12. Examples of these aromatic monomers include:

3-methylstyrene
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl)styrene
4-methoxystyrene
3,5-diphenoxystyrene
3-decoxystyrene
2,6-dimethyl-4-hexoxystyrene
4-dimethylaminostyrene
3,5-diethylaminostyrene
4-methoxy-6-di-n-propylaminostyrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)2-vinylnaphthalene
4-methoxy-1-vinylnaphthalene
6-phenoxy-1-vinylnaphthalene
3,6-dimethylamino-1-vinylnaphthalene
7-dihexoxy-2-vinylnaphthalene and the like.

The polar monomers include vinylpyridines and vinylquinolines in which the vinyl group is attached to a ring carbon other than a carbon in the beta position with respect to the nitrogen. These pyridines, quinolines or isoquinoline derivatives can contain substituents such as alkyl, cycloalkyl, aryl, alkaryl, aralkyl, alkoxy, aryloxy and dialkylamino groups in which the total number of carbon atoms in the combined substituents other than the vinyl group does not exceed 12. Any alkyl groups on the alpha or gamma carbons with respect to the nitrogen should be tertiary alkyl groups. Examples of polar monomers applicable include:

2-vinylpyridine
4-vinylpyridine
3,5-diethyl-4-vinylpyridine
5-methyl-2-vinylpyridine
5-n-octyl-2-vinylpyridine
3-n-dodecyl-2-vinylpyridine
3,5-di-n-hexyl-4-vinylpyridine
5-cyclohexyl-2-vinylpyridine
4-phenyl-2-vinylpyridine
3,5-di-tert-butyl-2-vinylpyridine
3-benzyl-4-vinylpyridine
6-methoxy-2-vinylpyridine
4-phenoxy-2-vinylpyridine
4-dimethylamino-2-vinylpyridine
3,5-dimethyl-4-diamylamino-2-vinylpyridine
2-vinylquinoline
4-vinylquinoline
2-tert-butyl-4-vinylquinoline
3-methyl-4-vinylquinoline
3-cyclohexyl-4-vinylquinoline
3-methyl-4-ethoxy-2-vinylquinoline
1-vinylisoquinoline 3-vinylisoquinoline
4-tert-dodecyl-1-vinylisoquinoline
3-dimethylamino-3-vinylisoquinoline
4-benzyl-3-vinylisoquinoline
4-phenyl-1-vinylisoquinoline and the like.

Other polar monomers include polymerizable nitriles and N,N-disubstituted amides, such as acrylonitrile, methacrylonitrile, N,N-dimethylacrylamine, N,N-diethylmethylacrylamide, and the like. Vinylfuran and N-vinylcarbazole can also be used.

In the preparation of the copolymers, the diene monomer will comprise at least 50 percent of the charge, preferably 70 percent or more, and polymerization conditions are controlled in a manner such that polymers of the desired molecular weight are obtained.

The conjugated diene polymers can be prepared by contacting the monomer or monomers which it is desired to polymerize with an organo alkali metal compound. The organo alkali metal compounds will contain from 1 to 4 alkali metal atoms, and thos containing 2 alkali metal atoms are more often employed. As will be explained hereinafter, lithium is the preferred alkali metal.

The organo alkali metal compound can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and alkali metal attached terminally to the polymer chain. Polymers containing only one terminal group, two terminal groups, or more than two terminal groups can be prepared within the scope of the invention.

The organo alkali metal initiators employed for preparing the polymers used in our invention can be represented by the formula $RM_x$ where R is a hydrocarbon radical selected from the group consisting of aliphatic, cycloaliphatic and aromatic radicals, M is an alkali metal including sodium, potassium, lithium, cesium, and rubidium and $x$ is an integer of from 1 to 4. The R in the formula generally contains from 1 to 20 carbon atoms although it is within the scope of the invention to use higher molecular weight compounds. By far the best results are obtained with organolithium compounds, which give very high conversions of monomer per unit weight of polymerization initator. Examples of polyalkali metal-substituted hydrocarbons which can be employed for the polymerization initiator include:

1,4-dilithiobutane
1,5-dipotassiopentane
1,4-disodio-2-methylbutane
1,10-dilithiodecane
1,20-dilithioeicosane
1,4-dilithio-2-methyl-2-butene
dilithionaphthalene
dilithioanthracene
1,2-dilithio-1,2-diphenylethane
1,4-dilithiocyclohexane
1,3,5-trilithiocyclohexane
1,2-di(lithiobutyl)-benzene
1,3-dilithio-4-ethylbenzene
1,4-dirubidiobutane
1,8-dicesiooctane
1,5-dilithio-3-pentyne
1,10-dicesio-4-decyne
dilithiophenanthrene
dilithiomethane
n-butyllithium
amyllithium
amylsodium
cyclohexyllithium
lithiobenzene
methylcesium and the like.

Certain specific initiators give better results than others and are preferred in carrying out preparation of the conjugated diene polymers. Lithium adducts of naphthalene, methylnaphthalenes, and anthracene give very good results. A preferred initiator is 1,2-dilithio-1,2-diphenylethane (lithium-stilbene adduct). Other preferred initiators for the formation of diene polymers are the dilithium adducts of 2,3-dialkyl-1,3-butadiene, e.g., 2,3-dimethyl-1,3-butadiene, and especially the dilithium adduct of butadiene or isoprene wherein the adduct contains from 1 to 7 diene units per molecule. The amount of initiator which can be used will vary depending on the polymer prepared, and particularly the molecular weight desired. Usually the initator is used in amounts between 0.25 and about 100 millimoles per 100 grams of monomer. The amount of initiator is regulated to provide polymers of whatever molecular weight is desired. Liquid polymers are preferred.

Formation of the terminally reactive polymers is generally carried out in the range of between $-148$ and $+302°$ F., preferably between $-101$ and $+167°$ F. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. It is preferred that the polymerization be carried out in the presence of a suitable diluent which is predominantly hydrocarbon, such as, benzene, toluene, cyclohexane, methylcyclohexane, xylene, n-butane, n-hexane, n-heptane, isooctane, and the like. Generally the diluent is selected from hydrocarbons, e.g., paraffins, cycloparaffins, and aromatics containing from 4 to 10 carbon atoms per molecule. It should be understood that relatively small amounts of other materials can be present, such as the ethers in which the initiator was dissolved, or a polar compound which is charged to encourage random copolymerization.

The terminally reactive polymers prepared as hereinbefore set forth contain an alkali metal atom on at least one end of the polymer chain and the organic radical of the initiator is present in the polymer chain. These terminally reactive polymers are treated with suitable reagents such as carbon dioxide, sulfuryl chloride, etc. and upon hydrolysis provide polymers containing terminal acidic groups. The acidic groups include groups such as SOH, $SO_3H$, $SO_2H$, COOH, $SeO_2H$, $SiO_2H$, $SnO_2H$, $SeO_3H$, $SbO_3H_2$, $TeO_2H$, $TeO_3H$, $AsO_3H_2$, $AsO_3H_3$. Reaction of terminally reactive polymer containing alkali metal atoms with the acid forming reagents can be carried out over a rather wide range of temperatures, e.g., $-101°$ to $+167°$ F., and preferably utilizing an amount of reagent in excess of stoichiometric. The following reactions present examples of specific methods which can be employed to introduce the terminal acidic groups. In these equations, A designates a polymer chain.

$$Li-A-Li+2CO_2 \rightarrow LiCO_2-A-CO_2Li$$

$$LiCO_2-A-CO_2Li+2HCl \rightarrow HOOC-A-COOH+2LiCl$$

$$Li-A-Li+SO_2Cl_2 \rightarrow LiSO_2Cl_2-A-SO_2Cl_2Li$$

$$LiSO_2Cl_2-A-SO_2Cl_2Li+2H_2O \rightarrow$$
$$HO_3S-A-SO_3H+2LiCl+2HCl$$

We have discovered that the tensile strength of the vulcanizates of these acidic-terminated unsaturated polymers can be effectively increased if the liquid and rubbery acidic-terminated polymers are subjected to a pretreatment at an elevated temperature, with an N-nitroso(nitroso-substituted aryl)-amine prior to the addition of carbon black and curatives.

As is evident to one skilled in the art, the various physical properties of these unsaturated and terminated polymers are difficult to optimize. If the polymerization reaction is permitted to proceed to a point where the polymer will exhibit a high tensile property it will tend to present problems in being readily castable and processable. On the other hand, if the inherent viscosity of the polymer is kept below 1.0, it will be easily castable and processable but will possess lower tensile strength than is desired when it is subsequently cured.

Therefore, it is an object of this invention to provide a method for improving the tensile property of vulcanizates made from cured low molecular weight and acidic-terminated unsaturated polymers.

Another object of this invention is to provide new and useful acidic-terminated conjugated diene polymers and copolymers by subjecting them to a pretreatment at an elevated temperature with a selected dinitroso compound prior to the addition of any curatives and prior to the polymer being vulcanized.

Yet another object of this invention is to improve the tensile properties of a vulcanized acidic-terminated conjugated diene polymer having an inherent viscosity of 1 or less.

These and other objects of the invention will become more readily apparent from the following detailed description and discussion.

The foregoing objects are realized broadly by reacting an unsaturated polymer containing terminal acidic groups with a selected dinitroso compound at an elevated temperature, after which the carbon black and curatives are added and the resulting mixture vulcanized. The polymer pretreatment at elevated temperature must occur prior to the mixture being vulcanized; otherwise, as will be demonstrated hereinafter, the improvement in the tensile property of the cured vulcanizate will not be realized. Likewise, no improvement is observed if a mixture of the carbon black and dinitroso compound is heated, the polymer and curative added, and the mixture vulcanized.

The dinitroso compound is selected from a group of compounds represented by the formula:

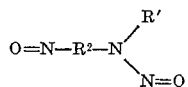

wherein $R^2$ is an aromatic nucleus selected from the group consisting of a benzene nucleus, a naphthalene nucleus, and an alkyl substituted derivative thereof with the alkyl groups preferably containing from 1–6 carbon atoms, and $R'$ is selected from the group consisting of hydrogen and alkyl radicals, preferably containing from 1–4 carbon atoms.

Illustrative of the compounds that can be employed are the following:

N-methyl-N,4-dinitrosoaniline
N,2-dinitrosoaniline
N-ethyl-N,3-dinitrosoaniline
1-(N-butyl-N-nitrosoamino)4-nitrosonaphthalene
2-ethyl-N-n-butyl-N,4-dinitrosoaniline
2,5-di-n-hexyl-N-ethyl-N,4-dinitrosoaniline
2(2-methylbutyl)-3-n-propyl-N-methyl-N,4-dinitrosoaniline
2,4,5,6-tetra(3-methylpentyl)-N-n-butyl-N,3-dinitrosoaniline
4-methyl-5-ethyl-N-propyl-N,2-dinitrosoaniline
2,5-dimethyl-4-nitroso-1-(n-butyl-N-nitrosoamino)naphthalene
3,6-di-n-hexyl-2-nitroso-1-(N-methyl-N-nitrosoamino)naphthalene
1,4-dimethyl-6-isopropyl-3-nitroso-2-(N-propyl-N-nitrosoamino)naphthalene.

The amount of N-nitroso(nitroso-substituted aryl)amine utilized is generally in the range of 0.5 to 10 parts by weight, preferably in the range of 2–8 parts by weight per 100 parts polymer. When compounding the acidic terminated polymers, the dinitroso compound is first blended with the polymer and the composition is heated to a temperature in the range of 100–300° F. The preferred temperature range is 150–250° F. The time of heating varies with the temperature and will generally be in the range of 5 minutes to 10 hours. In many instances satisfactory results are obtained in less than 5 hours, e.g., 10 minutes to 3 hours is often sufficient to give the desired results.

This invention is particularly applicable when carbon black is utilized as the reinforcing agent for the acidic-terminated polymers. After the polymer pretreatment step, carbon black is incorporated with one or more curatives as may be desired. It is usually preferred that the curatives be added last. Suitable curatives include poly-functional aziridinyl and epoxy compounds. The amount of carbon black is generally in the range of 10–250 parts by weight per 100 parts by weight of polymer, although amounts outside this range can be employed if desired.

Curatives which have been found to be effective are the aziridinyl compounds such as the triaziridinyl phosphine oxides or sulfides or the multifunctional aziridinyl-substituted triazines or triphosphatriazines, polyisocyanates, and polyepoxy compounds. Conventional curing agents can be employed as auxiliary curatives. Examples of such curatives include sulfur and sulfur compounds, peroxides such as benzoyl peroxide and dicumyl peroxide, and the like. Such curatives, if used, should be of a type and in amount which will cure in the environment in which the composition is used, e.g., from the action of heat, ultraviolet radiation or atmospheric oxygen.

The preferred polyaziridinyl compounds employed are typified by the triaziridinyl phosphine oxides and sulfides which can be represented by the formula:

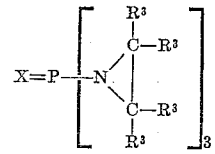

wherein X is selected from the group consisting of oxygen and sulfur, P is phosphorus, and each $R^3$ is a radical selected from the group consisting of hydrogen, alkyl, cycloalkyl and aryl radicals and composites thereof such as alkaryl, aralkyl and the like and the total $R^3$'s of each aziridinyl group containing up to a total of 20 carbon atoms. Specific phosphine oxide and sulfide reactants which can be used include:

tri(1-aziridinyl)phosphine oxide
tri(2-methyl-1-aziridinyl)phosphine oxide
tri(2,2-dimethyl-1-aziridinyl)phosphine oxide
tri(2-methyl-3-ethyl-1-aziridinyl)phosphine oxide
tri(2-ethyl-3-decyl-1-aziridinyl)phosphine oxide
tri(2-eicosyl-1-aziridinyl)phosphine oxide
tri(2-methyl-3-cyclopentyl-1-aziridinyl)phosphine oxide
tri(2-phenyl-1-aziridinyl)phosphine oxide
tri[2-ethyl-3-(1-naphthyl)-1-aziridinyl]phosphine oxide
tri(2-nonyl-3-benzyl-1-aziridinyl)phosphine oxide
tri[2-n-propyl-3-(2-phenylethyl)1-aziridinyl]phosphine oxide
tri[2-heptyl-3-(2,4-dimethylphenyl)1-aziridinyl]phosphine oxide
tri(2-methyl-1-aziridinyl)phosphine sulfide
tri(2-methyl-3-cyclohexyl-1-aziridinyl)phosphine sulfide
tri(2-phenyl-1-aziridinyl)phosphine sulfide
tri(2-amyl-3-benzyl-1-aziridinyl)phosphine sulfide.

Examples of other polyfunctional aziridinyl compounds are the aziridinyl-substituted triazines and triphosphatriazines, for example, the 1-aziridinyl-1,3,5-triazines and the 1-aziridinyl-2,4,6-triphospha-1,3,5-triazines represented by the formulas:

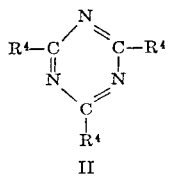 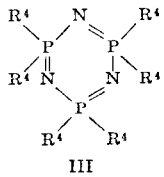

II    III wherein each R⁴ is a radical at least two of which in each formula are 1-aziridinyl radicals as defined above for the phosphine oxides and sulfides and the remainder are selected from the group consisting of said 1-aziridinyl radicals, hydrogen, alkyl, cycloalkyl and aryl radicals and compositions thereof, each hydrocarbon radical containing from 1 to 12 carbon atoms.

Examples of compounds represented by Formula II include the following:

2,4-di(1-aziridinyl)1,3,5-triazine
2-methyl-4,6-di(1-aziridinyl)1,3,5-triazine
2,4,6-tri(1-aziridinyl)1,3,5-triazine
2,4,6-tri(2-methyl-1-aziridinyl)1,3,5-triazine
2,4,6-tri(2-methyl-3-ethyl-1-aziridinyl)1,3,5-triazine
2,4,6-tri(2-ethyl-3-octadecyl-1-aziridinyl)1,3,5-triazine
2,4,6-tri(2-methyl-3-cyclopentyl-1-aziridinyl)1,3,5-triazine
2,4,6-tri(2-phenyl-1-aziridinyl)1,3,5-triazine
2,4,6-tri(2,3-diphenyl-1-aziridinyl)1,3,5-triazine
2,4,6-tri(2-n-propyl-3-(2-phenylethyl)1-aziridinyl)1,3,5-triazine
2,4,6-tri[2-methyl-3-(4-methylphenyl)1-aziridinyl]1,3,5-triazine and the like.

Examples of compounds represented by Formula III are:

2,4-di(1-aziridinyl)2,4,6-triphospha-1,3,5-triazine
2,4,6-tri(1-aziridinyl)2,4,6-triphospha-1,3,5-triazine
2,4,6-tri(2-methyl-3-n-butyl-1-aziridinyl)2,4,6-triphospha-1,3,5-triazine
2,4,6-tri(2-ethyl-3-cyclohexyl-1-aziridinyl)2,4,6-triphospha-1,3,5-triazine
2,4,6-tri(2-n-propyl-3-(2-phenylethyl)1-aziridinyl)2,4,6-triphospha-1,3,5-triazine
2,4,6-tri(2-heptyl-3-(2,4-dimethylphenyl)1-aziridinyl)-2,4,6-triphospha-1,3,5-triazine
2,2,4,4,6-hexa(2-methyl-1-aziridinyl)2,4,6-triphospha-1,3,5-triazine, hereinafter referred to as hexa-2-methyl-1-aziridinyltriphosphatriazine
2,2,4,6-tetra(2-hexyl-1-aziridinyl)2,4,6-triphospha-1,3,5-triazine and the like.

Other difunctional aziridinyl compounds which can be employed are defined by the formula:

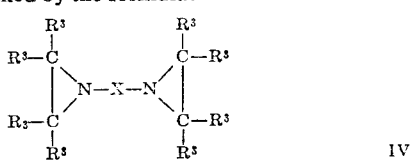

IV wherein X is selected from the group consisting of carbonyl, phenyl phosphoryl, phenyl thiophosphoryl, sulfoxy or sulfonyl and each R³ is as defined above for the aziridinyl radical of the phosphine oxides. In a preferred species X is phenyl phosphoryl or sulfoxy attached to (2-methyl-1-aziridinyl) groups. Examples of these difunctional aziridinyl compounds are:

phenyl-bis(2-methyl-1-aziridinyl)phosphine sulfide
phenyl-bis(2-methyl-1-aziridinyl)phosphine oxide
phenyl-bis(2-ethyl-1-aziridinyl)phosphine oxide
phenyl-bis(2-methyl-3-ethyl-1-aziridinyl)phosphine oxide
phenyl-bis(2-butyl-1-aziridinyl)phosphine oxide
bis(2-methyl-1-aziridinyl)sulfoxide
bis(2-propyl-1-aziridinyl)sulfoxide
bis(2-methyl-3-propyl-1-aziridinyl)sulfoxide
(2-methyl-1-aziridinyl-2-butyl-1-aziridinyl)sulfoxide
bis(1-aziridinyl)sulfone
bis(2-methyl-1-aziridinyl)sulfone
bis(2-ethyl-1-aziridinyl)sulfone
bis(2-propyl-1-aziridinyl)sulfone
bis(2-ethyl-3-propyl-1-aziridinyl)sulfone
(2-methyl-1-aziridinyl-2-ethyl-1-aziridinyl)sulfone
bis(1,2-propylene)1,3-urea
bis(1,2-pentylene)1,3-urea
bis(4,5-octylene)1,3-urea and the like.

Suitable polyepoxy compounds include epoxy alkanes containing from 4–10 carbon atoms and at least 2 epoxy groups per molecule, for example:

diepoxybutane
1,2,5,6-diepoxyhexane
triepoxyhexane
1,2,5,6,9,10-triepoxydecane
2,3,6,7,11,12-triepoxydodecane
pentaepoxyeicosane.

Other epoxy compounds that are suitable curatives for acidic-terminated polymers include epoxidized liquid polybutadienes, and these materials having the following formulas:

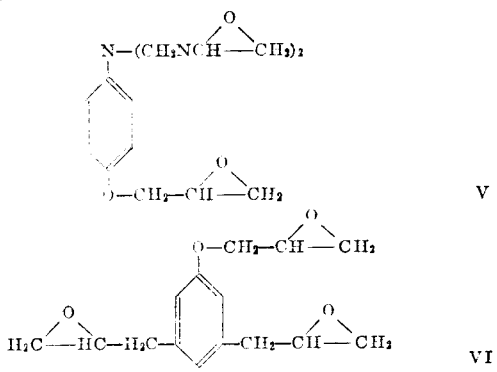

V

VI

The compound of Formula V is available from Union Carbide under the designation ERL–0500 while the compound of Formula VI is available from Shell under the designation Epon Resin X-801. An accelerator such as a tertiary amine is usually utilized when the Shell compound is employed as curative. The epoxy curatives are particularly desirable where increased adhesiveness of the polymeric material is desired.

The quantity of curative employed is generally in the range of about 0.5 to 10 equivalents, preferably in the range of about 0.9 to about 6 equivalents, based on the functional groups in the polymer.

The compositions can be vulcanized at temperatures in the range of 125–300° F. Preferred temperatures are in the range of 150–250° F.

In addition to carbon black and the aforementioned curatives, metal oxides such as aluminum oxide, magnesium oxide, and zinc oxide, plasticizers, antioxidants, and other ingredients used in conventional rubber compounding can be employed if desired.

The following example is presented in illustration of the invention.

Example

Liquid carboxy-terminated polybutadiene was prepared by the polymerization of 1,3-butadiene in the presence of a lithium-methylnaphthalene-isoprene catalyst solubilized with butadiene. The diluent was cyclohexane. Polymerization temperature was 122° F. Immediately following polymerization the unquenched reaction mixture was carbonated and then acidified to convert the lithium salt of the carbonated polymer to the carboxy-terminated polymer. The product had a carboxy content of 1.66 weight percent and an inherent viscosity of 0.25.

Several compositions were prepared containing the liquid carboxy-terminated polymer, N-methyl-N,4-dinitrosoaniline, carbon black, and an aziridinyl curative. The data are presented in Table I. In runs 1, 2, and 3 the N-methyl-N,4-dinitrosoaniline was added to the liquid carboxy-terminated polybutadiene and the mixture was heated two hours at 200° F. in a vacuum oven prior to adding carbon black and then the curative. In run 4 a mixture of the carbon black and dinitroso compound was heated two hours at 200° F. after which the liquid polymer was added and then the curative. Runs 5 and 6 were conducted by blending the dinitroso compound with the carboxy-terminated polymer and adding the carbon black immediately thereafter. The curative was incorporated last. The same procedure was followed in run 7 as was used in runs 5 and 6 except that the dinitroso compound was omitted. All compositions were cured two hours at 250° F. Tensile strength and elongation were determined on the vulcanizates using an elongation rate of 20 inches per minute.

TABLE I

| Run No. | Parts By Weight | | | HMAT,[1] Equiv.[2] | Tensile,[3] p.s.i. | Elong., percent |
|---|---|---|---|---|---|---|
| | COOH-terminated Polymer | High Abrasion Furnace Black | N-methyl-N,4-Dinitrosoaniline | | | |
| 1 | 100 | 50 | 4 | 1.7 | 1,190 | 110 |
| 2 | 100 | 100 | 4 | 1.7 | 1,490 | 50 |
| 3 | 100 | 50 | 8 | 1.7 | 1,035 | 90 |
| 4 | 100 | 50 | 4 | 1.7 | 790 | 130 |
| 5 | 100 | 50 | 2 | 1.7 | 925 | 135 |
| 6 | 100 | 50 | 6 | 1.7 | 890 | 140 |
| 7 | 100 | 50 | | 1.7 | 980 | 140 |

[1] 2,2,4,4,6,6-Hexa(2-methyl-1-aziridinyl)-2,4,6-triphosphatriazine.
[2] Equivalents based on carboxy content of polymer.
[3] ASTM D-412-61T used for determining tensile and elongation.

The above data shows quite conclusively that the tensile strength of the vulcanizates in runs 1–3, wherein the dinitroso compound was added to the polymer prior to the addition of carbon black and a curative, was improved over runs 4–7 wherein variations in the order of adding the ingredients were made. If the concentration of the dinitroso compound exceeds 10 parts by weight per 100 parts by weight of polymer, its effect on the tensile property of the vulcanizate will not be realized.

It is readily observed that to achieve the full effect of the addition of the dinitroso compound that the order of precedence in which the ingredients are added to the polymer is critical and if this order of precedence is varied in any manner the new and improved result will not be realized.

Obviously many modifications and variations of the present invention are possible in the light of the above teachings. It is therefore to be understood that within the scope of the appended claims the invention may be practiced otherwise than as specifically described herein.

We claim:

1. A method for increasing the tensile strength of acidic-terminated unsaturated polymer vulcanizates; said method comprising the step of pretreating an acidic-terminated unsaturated polymer, prior to compounding with carbon black and curing, with a compound having the formula:

$$O=N-R^2-N\diagup_{N=O}^{R'}$$

wherein $R^2$ is an aromatic nucleus selected from the group consisting of a benzene nucleus, a naphthalene nucleus, an alkyl substituted derivative thereof with the alkyl groups containing from 1 to 6 carbon atoms, and $R'$ is selected from the group consisting of hydrogen and alkyl radicals containing from 1 to 4 carbon atoms at a temperature within the range of about 100–300° F., said compound being present in the range of about 0.5 to 10 parts by weight compound per 100 parts by weight polymer; and curing the pretreated polymer to produce a vulcanizate having an improved tensile strength over a vulcanizate not so treated.

2. A method for increasing the tensile strength of acidic-terminated unsaturated polymer vulcanizates, said method comprising the steps of polymerizing a conjugated diene having 4–12 carbon atoms in the presence of an organo alkali metal catalyst compound to produce a polymer containing terminal alkali metal atoms; replacing said alkali metal atoms with acidic groups; treating the acidic-terminated unsaturated polymer, prior to compounding with carbon black and curing, with a compound having the formula:

$$O=N-R^2-N\diagup_{N=O}^{R'}$$

wherein $R^2$ is an aromatic nucleus selected from the group consisting of a benzene nucleus, a naphthalene nucleus, an alkyl-substituted derivative thereof with the alkyl groups containing from 1 to 6 carbon atoms, and $R'$ is selected from the group consisting of hydrogen and alkyl radicals containing from 1 to 4 carbon atoms at a temperature within the range of about 100–300° F., said compound being present in the range of about 0.5 to 10 parts by weight compound per 100 parts by weight polymer; mixing a compound selected from the group consisting of epoxy alkanes containing from 4 to 20 carbon atoms and at least 2 epoxy groups per molecule; epoxidized liquid polybutadiene, and those materials having the formulas:

$$X=P\left[-N-\underset{\underset{R^3}{|}}{\overset{\overset{R^3}{|}}{C}}-R^3 \atop \phantom{-N-}\diagdown C-R^3\right]_3$$

$$R^4-C\diagup^{N}\diagdown_{N}C-R^4 \atop \phantom{R^4-}\diagdown N\diagup^{N}\diagup \atop \phantom{R^4-C}C \atop \phantom{R^4-C}R^4$$

$$\underset{R^4}{R^4}\diagdown N\overset{N}{=}\underset{\|}{P}\diagup^{N}\diagdown\underset{N}{\overset{\|}{P}}\diagup^{R^4}_{R^4} \atop \phantom{R^4}\diagdown P\diagup \atop R^4\phantom{---}R^4$$

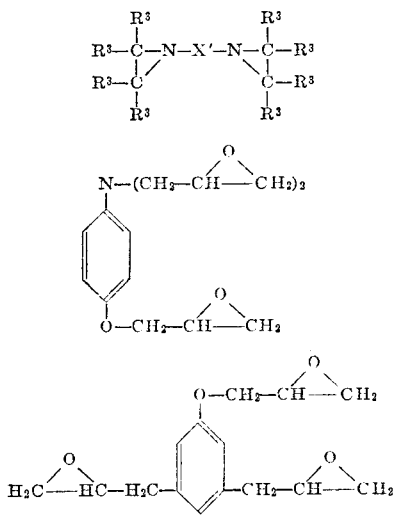

wherein X is selected from the group consisting of oxygen and sulfur, P is phosphorus, and each $R^3$ is a radical selected from the group consisting of hydrogen, alkyl, cycloalkyl, and aryl radicals and composites thereof such as alkaryl, aralkyl, with the total $R^3$ containing up to a total of 20 carbon atoms; each $R^4$ is selected from the group consisting of 1-aziridinyl radicals, hydrogen, alkyl, cycloalkyl, and aryl radicals and compositions thereof, wherein at least two of such radicals are 1-aziridinyl and each $R^4$ radical containing from 1 to 12 carbon atoms and each X' is selected from the group consisting of carbonyl, phenyl phosphoryl, phenyl thiophosphoryl, sulfoxy and sulfonyl radicals; and reacting the thus formed mixture at 100–300° F. to produce a vulcanizate of increased molecular weight.

3. A method for increasing the tensile strength of cured acidic-terminated unsaturated polymers, said method comprising the steps of polymerizing a conjugated diene having from 4 to 12 carbon atoms in the presence of an organo alkali metal catalyst compound and a solvent selected from the group consisting of benzene, toluene, cyclohexane, isooctane, xylene, to produce a polymer containing terminal alkali metal atoms; replacing said alkali metal atoms with acidic groups; treating the acidic terminated unsaturated polymer, prior to compounding with a filler selected from the group consisting of carbon black, aluminum oxide, magnesium oxide and zinc oxide and curing, with N-methyl-N,4-dinitrosoaniline at a temperature in the range of 100–300° F., said N-methyl-N,4-dinitrosoaniline being present in the range of about 0.5 to 10 parts by weight compound per 100 parts by weight polymer; mixing the treated acidic-terminated unsaturated polymer and the filler with tri(1-aziridinyl)phosphene oxide; and reacting the thus formed mixture at about 125–300° F. to produce a polymer product of increased molecular weight.

4. A method for increasing the tensile strength of cured acidic-terminated unsaturated polymers containing at least 2 terminal carboxy groups and having an inherent viscosity less than 1.0, said polymer having been prepared by polymerizing a conjugated diene having 4–8 carbon atoms in the presence of lithium methyl-naphthalene-isoprene adduct and cyclohexane to produce a polymer containing terminal alkali metal atoms and subsequently replacing said alkali metal atoms with carboxy groups, the said method comprising the improvement of first treating the polymer, prior to compounding with from about 10–250 parts by weight of carbon black per 100 parts by weight of polymer and curing, with N,2-dinitrosoaniline at a temperature in the range of 100–300° F., said N,2-dinitrosoaniline being present in the range of about 0.5 to 10 parts by weight per 100 parts by weight polymer; incorporating 10–250 parts by weight carbon black per 100 parts by weight polymer with the treated polymer; mixing the treated polymer and carbon black with diepoxybutane; and reacting the thus formed mixture at about 150–250° F. to produce a polymer product of increased tensile strength over a polymer product not so treated.

5. A method for increasing the tensile strength of a liquid carboxy-terminated polymer having an inherent viscosity less than 1.0, said method comprising the steps of polymerizing a conjugated diene having 4–8 carbon atoms in the presence of lithium-methylnaphthalene-isoprene adduct at a temperature of 101 to +167° F. and in the presence of cyclohexane to produce a polymer containing terminal alkali metal atoms and subsequently replacing said alkali metal atoms with carboxy groups; pretreating the carboxy-terminated polybutadiene, prior to compounding with from about 10–250 parts by weight of carbon black per 100 parts by weight of polymer and curing, with N-methyl-N,4-dinitrosoaniline at a temperature of 150–250° F. and in the range of 2 to 8 parts by weight per 100 parts by weight of conjugated diene; incorporating 10–250 parts by weight carbon black per 100 parts by weight polymer with the treated liquid carboxy terminated polybutadiene; carboxy terminated polybutadiene and carbon black; and reacting the resulting mixture at about 150–250° F. for a sufficient period of time to cure said resulting mixture and to form a polymer product of increased molecular weight and tensile strength.

6. A method according to claim 3 wherein said polymer is 1,3-butadiene.

7. The process of claim 3 in which the polymer is a copolymer of butadiene and styrene.

8. The process of claim 3 in which the polymer is a copolymer of isoprene and styrene.

References Cited

UNITED STATES PATENTS

| | | | |
|---|---|---|---|
| 3,214,421 | 10/1965 | Mahan | 260—94.7 |
| 3,264,254 | 8/1966 | Tung | 260—41.5 |

JULIUS FROME, *Primary Examiner.*

S. L. FOX, *Assistant Examiner.*

UNITED STATES PATENT OFFICE
CERTIFICATE OF CORRECTION

Patent No. 3,354,116                      November 21, 1967

Jerry T. Gruver et al.

It is hereby certified that error appears in the above numbered patent requiring correction and that the said Letters Patent should read as corrected below.

Column 12, line 27, for "101" read -- -101 --; line 39, after "butadiene;" insert -- mixing 0.9 to 6 equivalents of 2,2,4,4,6,6-hexa(2-methyl-1-aziridinyl)2,4,6-triphosphatriazine with the treated --; same column 12, lines 17 and 18, strike out "mixing the treated polymer and carbon black with diepoxybutane --.

Signed and sealed this 11th day of February 1969.

(SEAL)
Attest:

Edward M. Fletcher, Jr.
Attesting Officer

EDWARD J. BRENNER
Commissioner of Patents